No. 760,505. PATENTED MAY 24, 1904.
J. M. WILCOX.
CAR AXLE.
APPLICATION FILED OCT. 13, 1903.
NO MODEL.
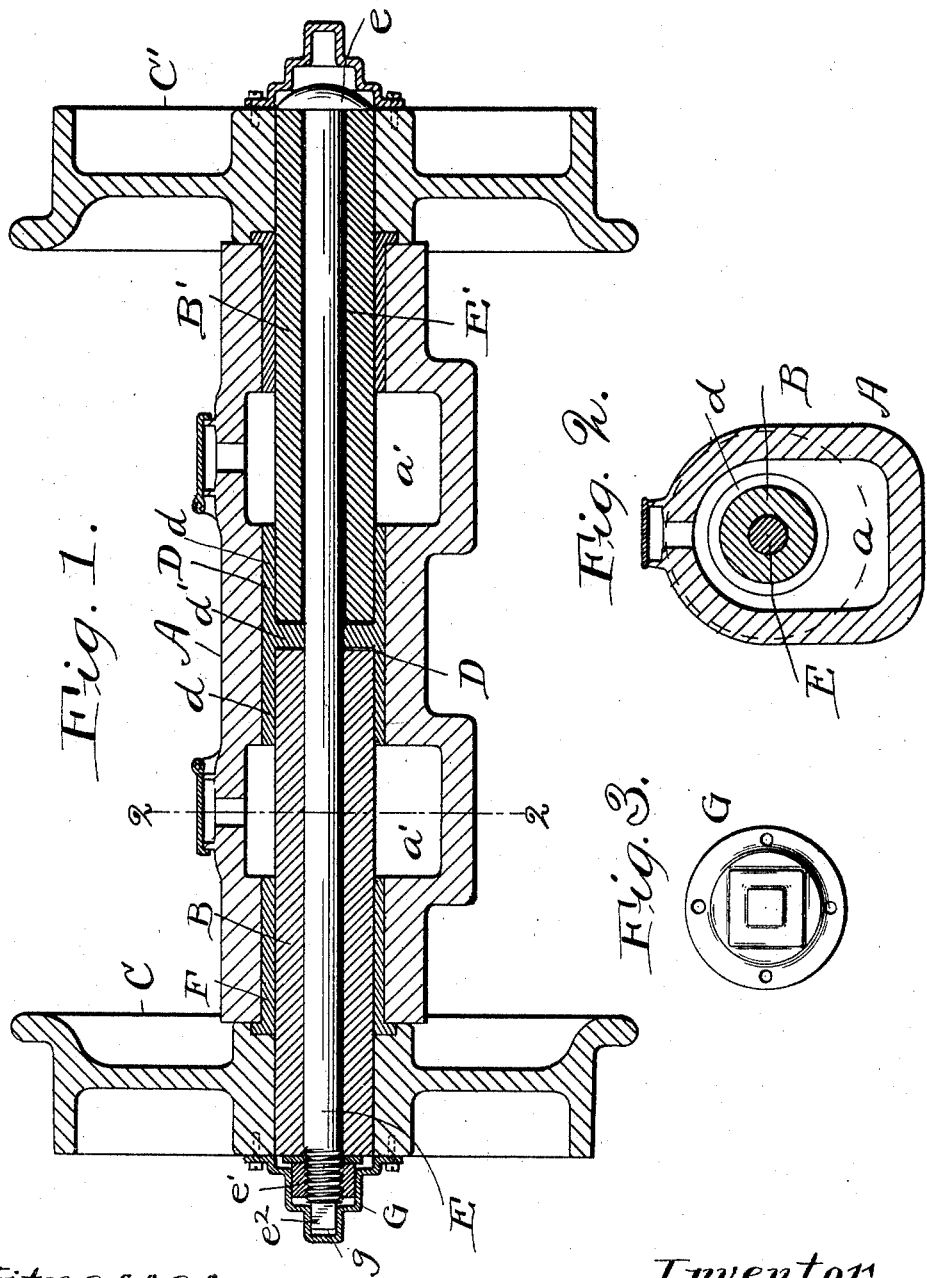

No. 760,505.

Patented May 24, 1904.

UNITED STATES PATENT OFFICE.

JOHN M. WILCOX, OF CLEVELAND, OHIO.

CAR-AXLE.

SPECIFICATION forming part of Letters Patent No. 760,505, dated May 24, 1904.

Application filed October 13, 1903. Serial No. 176,901. (No model.)

*To all whom it may concern:*

Be it known that I, JOHN M. WILCOX, a citizen of the United States, residing at Cleveland, in the county of Cuyahoga and State of Ohio, have invented a certain new and useful Improvement in Car-Axles, of which the following is a full, clear, and exact description, reference being had to the accompanying drawings.

The object of the invention is to provide a strong, durable, and efficient car-axle especially useful for mining-cars and capable of being easily assembled and disassembled.

The invention may be summarized as consisting in the construction and combination of parts hereinafter described, and pointed out definitely in the claims.

In the drawings, Figure 1 is a longitudinal vertical section through a car-axle embodying my invention. Fig. 2 is a transverse sectional view in the plane indicated by line 2 2 of Fig. 1, and Fig. 3 is an end view of the cap.

Referring to the parts by letters, A represents the axle-sleeve, which is to be attached rigidly or otherwise to the car-frame.

B B' represent two tubular axle-sections, to the outer ends of which the wheels C C' are rigidly secured by any appropriate means. For example, they may be shrunk upon said axle-sections.

D represents a center bushing which is fitted to the sleeve A and has in its ends cylindrical recesses $d$, in which the inner ends of the axle-sections are rotatably fitted. There is in this bushing a transverse partition $d'$, which by engagement with the axle-sections limits its endwise movement and holds it in a position to serve as the bearing for the inner ends of both axle-sections. A bushing F is also fitted into each outer end of the sleeve A, and in this bushing the outer parts of the axle-sections are mounted. These bushings may be rotatably fitted in the sleeve A, or the axle-sections may be rotatably fitted to said bushings. The two axle-sections must, however, be independently rotatable. The two axle-sections are held in proper relationship with each other in their bearings by a long tie-rod E. This rod must have a loose fit in one of the axle-sections, as E', so that said rod and axle-section may rotate independently. The tie-rod has a head $e$, which engages with the independently-rotatable section. Its other projecting end is threaded for the reception of the nut $e'$, by which the axle-sections may be drawn toward each other and into proper relationship—namely, into such a position as will permit both sections to rotate within the sleeve A without too much end motion and without too much friction of the wheels upon the end of the sleeve. To prevent the tie-rod from turning in the axle-section B, the extreme end is made angular, preferably square, as at $e^2$, and a locking device, which is fast to the wheel, (and therefore fast to the axle-section to which the wheel is attached,) engages said squared end. This locking device is in the form of a cap G, having a squared recess $g$, which embraces the squared end $e^2$ of the tie-rod. This cap also embraces the nut $e'$ and prevents it from turning on the tie-rod. This cap is secured fast to the wheel by screws, and it serves, in addition to the purposes before mentioned, the purpose of preventing the escape of the lubricating-oil from the end of the axle.

The described device is self-lubricating, because of the oil-pockets $a'$ in the sleeve A, through which the axle-sections pass.

Having described my invention, I claim—

1. The combination, with a fixed sleeve, two independent rotatable tubular axle-sections journaled therein, and wheels fastened respectively to said axle-sections, a tie-rod passing through both axle-sections and having one projecting end which is threaded, a nut on said threaded end and means connecting the tie-rod with the axle-section adjacent to said threaded end, whereby their relative rotation is prevented.

2. The combination, with a fixed sleeve, of two independent tubular axle-sections journaled therein, and wheels fastened respectively to said axle-sections, a tie-rod passing through both axle-sections, and having one projecting end which is threaded and has an angular extremity, a nut screwed onto said threaded portion, and a locking device fastened to the axle and engaging with the nut and the angular end of the rod to prevent their revolution relative to said axle-section and to each other.

3. The combination, with a fixed sleeve, of two independent tubular axle-sections journaled therein, and wheels fastened respectively to said axle-sections, a tie-rod passing through both axle-sections, and having one projecting end which is threaded and has an angular extremity, a nut screwed onto said threaded portion, a cap fastened to the wheel and having an angular end which engages with the nut, and another angular recess which engages with the angular end of the shaft.

4. The combination, with a fixed sleeve, a bushing therein having in its ends cylindrical recesses which are separated from each other by a transverse partition, two independent tubular axle-sections which are rotatably mounted in said sleeve and having their inner ends rotatable in said bushing, wheels secured to the outer end of said axle-sections, and means holding the axle-sections against relative endwise movement.

In testimony whereof I hereunto affix my signature in the presence of two witnesses.

JOHN M. WILCOX.

Witnesses:
  E. L. THURSTON,
  B. W. BROCKETT.